United States Patent [19]

Sutton

[11] Patent Number: 4,586,119
[45] Date of Patent: Apr. 29, 1986

[54] OFF-LINE SWITCHING MODE POWER SUPPLY

[75] Inventor: Leonard J. Sutton, Guelph, Canada

[73] Assignee: ITT Corporation, New York, N.Y.

[21] Appl. No.: 600,701

[22] Filed: Apr. 16, 1984

[51] Int. Cl.$^4$ .......................................... H02M 3/335
[52] U.S. Cl. .......................................... 363/17; 363/98
[58] Field of Search ................ 363/17, 21, 23, 24, 363/25, 26, 56, 86, 98; 323/266, 267

[56] References Cited

U.S. PATENT DOCUMENTS

| | | |
|---|---|---|
| 3,341,765 | 9/1967 | Rogers, Jr. et al. |
| 3,551,777 | 12/1970 | Bingley . |
| 4,144,463 | 3/1979 | Sugiura . |
| 4,217,632 | 8/1980 | Bardos et al. |
| 4,274,133 | 6/1981 | Cuk et al. ............................. 363/20 |
| 4,322,817 | 3/1982 | Kuster . |
| 4,410,935 | 10/1983 | Dang .................................... 363/56 |
| 4,453,193 | 6/1984 | Huang et al. ......................... 363/56 |
| 4,502,104 | 2/1985 | Mitchell .............................. 363/26 |
| 4,525,774 | 6/1985 | Kino et al. ........................... 363/98 |

FOREIGN PATENT DOCUMENTS

| | | |
|---|---|---|
| 140154 | 10/1979 | Japan ..................................... 363/17 |
| 58-19921 | 2/1983 | Japan ..................................... 363/21 |

OTHER PUBLICATIONS

"System 3100M DC/DC Converter PCB (185039)", ITT Practices, Issue 1, Feb. 1983.
"System 3100M DC/AC Power Supply (185158)", ITT Practices, Issue 1, Feb. 1982.

Primary Examiner—Peter S. Wong
Assistant Examiner—Judson H. Jones
Attorney, Agent, or Firm—John T. O'Halloran; Thomas F. Meagher

[57] ABSTRACT

An off-power line switching mode power supply which employs current and voltage feedback and sensing converts primary rectified, unregulated high voltage to a number of regulated d.c. secondary voltages and a low frequency, high voltage output suitable for enabling ringing of standard telephones. Two high voltage field effect transistors connected in the half-bridge configuration power multiple output circuits via a capacitively coupled transformer. A pulse width modulator controls the high frequency switching times of the field effect transistors via a transformer-coupled drive circuit.

15 Claims, 5 Drawing Figures

OFF-LINE SWITCHING MODE POWER SUPPLY

BACKGROUND OF THE INVENTION

1. Field of the Invention

The present invention relates to an off-power line switching mode power supply which converts primary rectified, unregulated high voltage to a number of regulated d.c. secondary voltages and a low frequency, high voltage output suitable for enabling ringing of standard telephones.

2. Description of the Prior Art

Typical prior art off-power line power supplies had large choke fed secondary outputs "slaved" from the highly regulated output of one of the d.c. output voltages of the plurality of d.c. output voltages provided by the power supply. Such a design, however, would not permit large load variations of the highly regulated output without causing excessively high primary peak current, of a potentially destructive nature, from damaging the switching transistors of the power supply.

Certain prior art off-power line power supplies have attempted to correct this problem by the use of a push-pull arrangement of bipolar power transistors with a center-tapped transformer primary winding. However, if an imbalance in the conduction times of the transistors occurs, a d.c. current can pass through the transformer primary causing impending core saturation and device destruction. Such an imbalance results from the variation of the storage time of bipolar transistors from device to device.

Other prior art off-power line power supplies have combined the use of a half-bridge inverter with saturable reactors. However, transformer core saturation and transistor damage result if symmetry of operation of the saturable reactors is not achieved. Symmetry control is attempted at the cost of d.c. losses and circuit complexity.

SUMMARY OF THE INVENTION

Briefly, the present invention is an off-power line switching mode power supply which provides good reliability, stability, and performance without the cost of high d.c. losses or high saturation currents. This invention minimizes d.c. losses through the use of power switching field effect transistors which are switched at a high switching frequency allowing a small core usage. This invention also allows large load variations of a highly regulated voltage output of the power supply without causing destructive primary currents. Capacitive coupling of the output transformer frees the transformer from possible core saturation problems under unbalanced drive conditions.

The circuit of the present invention consists of two high voltage field effect transistors (FETs) connected in the half-bridge configuration. The FETs power multiple output circuits via a transformer. A pulse width modulator controls the switching times of the FETs via a transformer-coupled drive circuit. Reliability, stability, and high performance are provided by this circuit through use of a unique current and voltage feedback and sensing arrangement.

DESCRIPTION OF THE PREFERRED EMBODIMENTS

Figure 1:
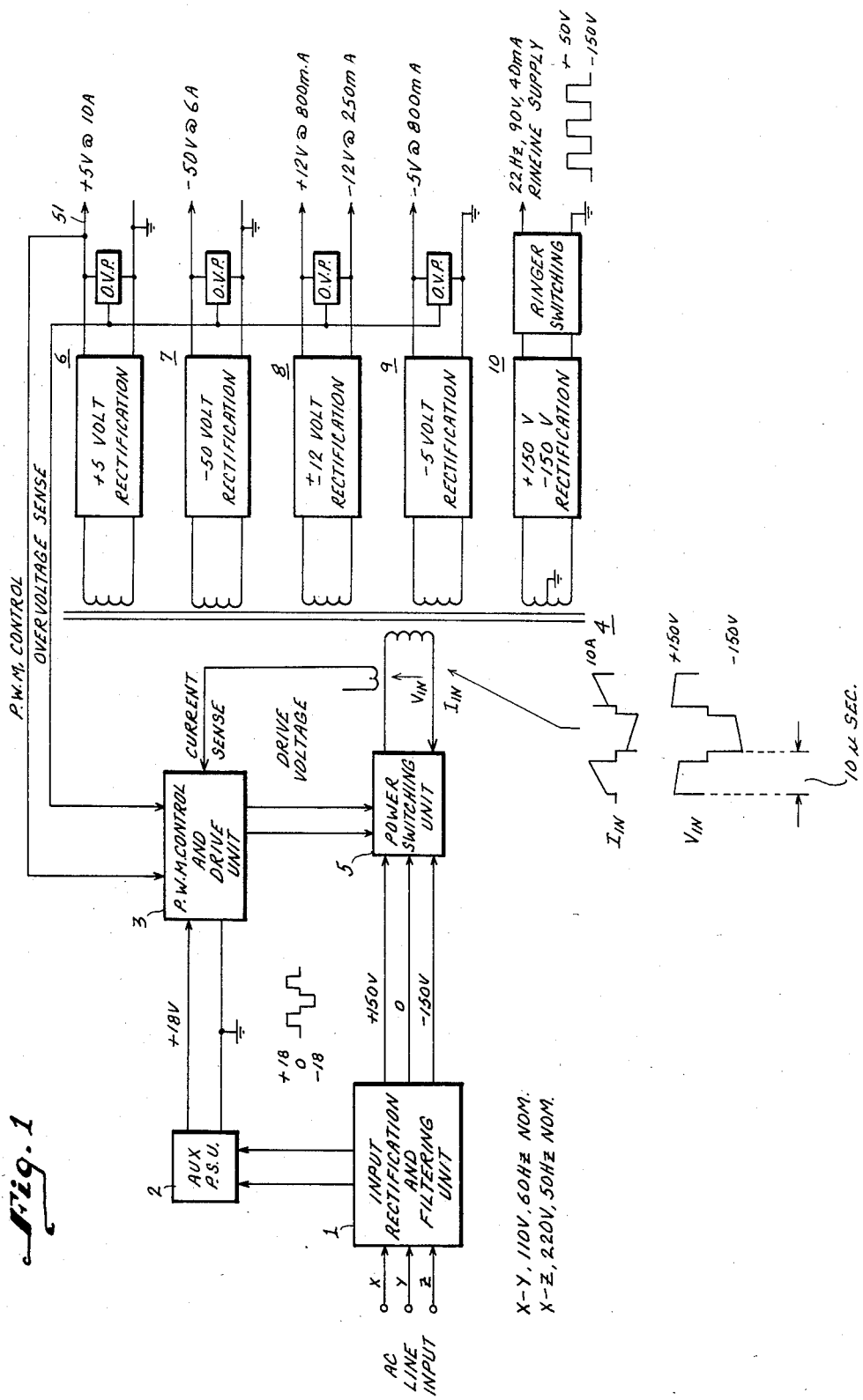
FIG. 1 shows a block diagram of an embodiment of this invention.

Referring to FIG. 1, the input rectification and filtering unit 1 accepts an input voltage of 110 VAC or 220 VAC, selectible by the user.

In the 110 volt mode of connection, the input rectifier and capacitive filter of input unit 1 acts as a doubler circuit, generating a d.c. bus of ±150 volt nominal. A small power transformer and regulator, auxiliary power supply unit 2, provide a d.c. voltage of nominally +18 volts to provide power for the pulse width modulator control and drive unit 3.

The pulse width modulator (PWM) of unit 3 utilizes, e.g., an SG 3526 control I.C. to provide direct transformer drive to the output transformer 4. Drive control is effected through sensing of the +5 volt output line 51 and thus adjusting the time that energy is available to the output transformer 4 (i.e., higher input line voltage or decreasing load, reduces the pulse width; lower input line voltage or increasing load, increases pulse width).

Additionally, this device is shut down to protect the unit and the load circuit under fault conditions. Each output voltage circuit has an overvoltage protection circuit O.V.P. that reduces the pulse width to zero if the output voltage of the individual output voltage circuit exceeds a predetermined level. A current sensing transformer in the power switching unit 5 detects current flowing through it and is likewise used to shut down the PWM I.C. should a potentially damaging current level be reached.

The power switching transistors of power switching unit 5 are connected in the half-bridge configuration and comprise two high voltage field effect transistors (FETs). These require only a small drive current from pulse width modulation unit 3 and they do not require complex turn-off circuitry, as is required with bipolar devices. The output transformer 4 is capacitive coupled to power switching unit 5, thus largely freeing the transformer from possible core saturation problems under unbalanced drive conditions. Due to the use of a high switching frequency (e.g., 100 KHz), a very small core usage is possible (e.g., TDK 32/30). This permits a very high power throughput compared to comparable linear regulators powered off the line.

The +5 volt output circuit 6 utilizes Schottky rectifiers to minimize forward voltage drop losses. A sample of the output voltage is fed back to pulse width modulation unit 3 as described previously.

The −50 volt output is full wave rectified by the −50 volt output circuit 7, as is the +5 volt output of +5 volt output circuit 6, with an inductor and capacitor to provide energy storage and filtering. Although not directly controlled by feedback, the regulation of the −50 volt output of −50 volt output circuit 7 is adequate for some applications of the system.

The ±12 volt output circuit 8 and the −5 volt output circuit 9 provide regulated output voltages of +12 volts, −12 volts, and −5 volts via standard 3-pin regulators (e.g., National LM317/337).

The ringing voltage supply circuit 10 generates +50 volts and −150 volts at a low power level. High voltage transistors are switched in series with each of these generated voltages at 22 Hz rate, utilizing, e.g., an SG 3524 control I.C. This provides a "ringing" voltage supply of nominally 90V RMS for system phones.

Overcurrent conditions are sensed across resistors in each supply voltage and are used to inhibit the output under fault conditions.

Additionally, test points and L.E.D. indicators may be provided as servicing aids on the front of a unit housing the power supply. An illuminated breaker switch may also be provided to enable power to the unit via a dedicated input power cord fed through the housing assembly.

Figure 2:
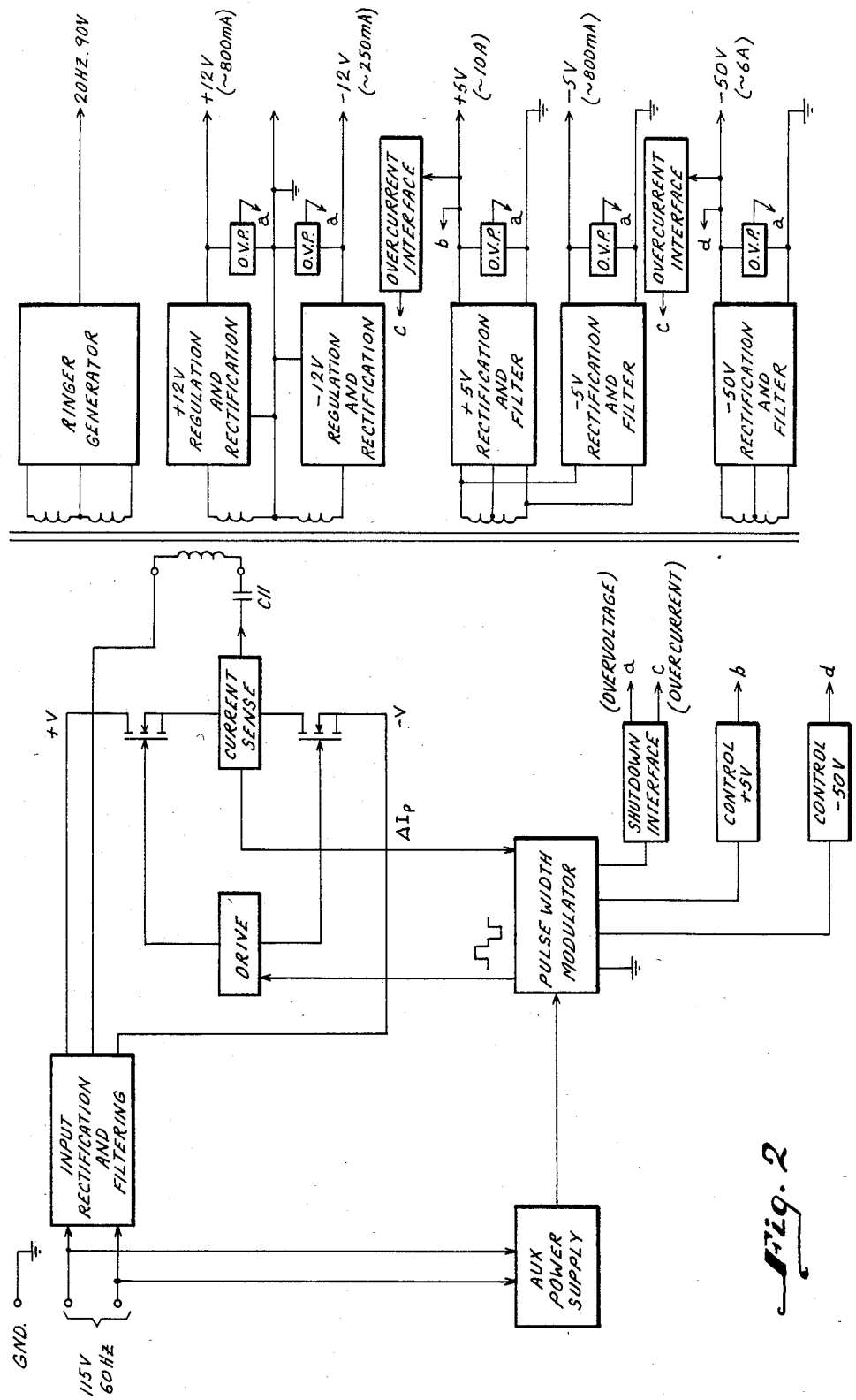
FIG. 2 shows a block diagram of another embodiment of this invention.
Figure 3:
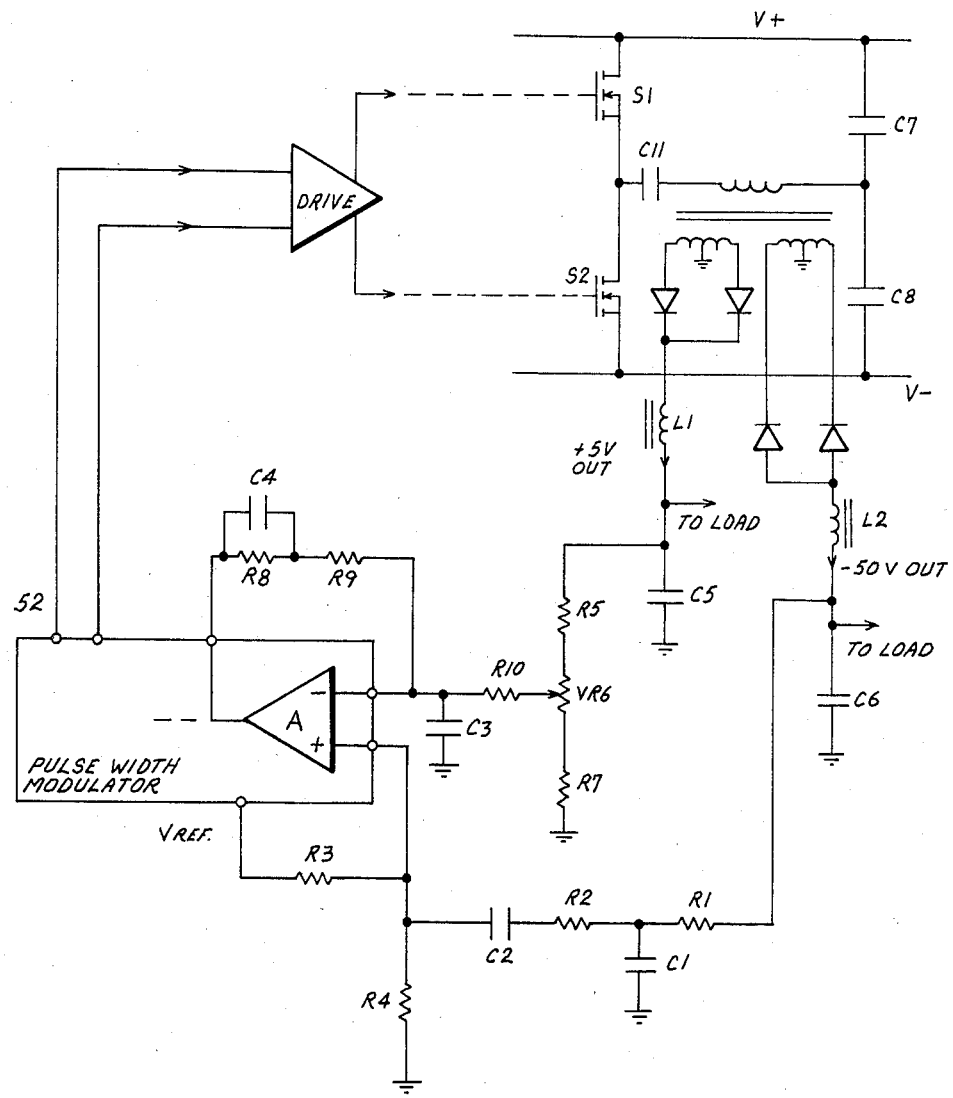
FIG. 3 is a schematic diagram of the pulse width modulation control portion of the circuit arrangement of FIG. 2.
Figure 5:
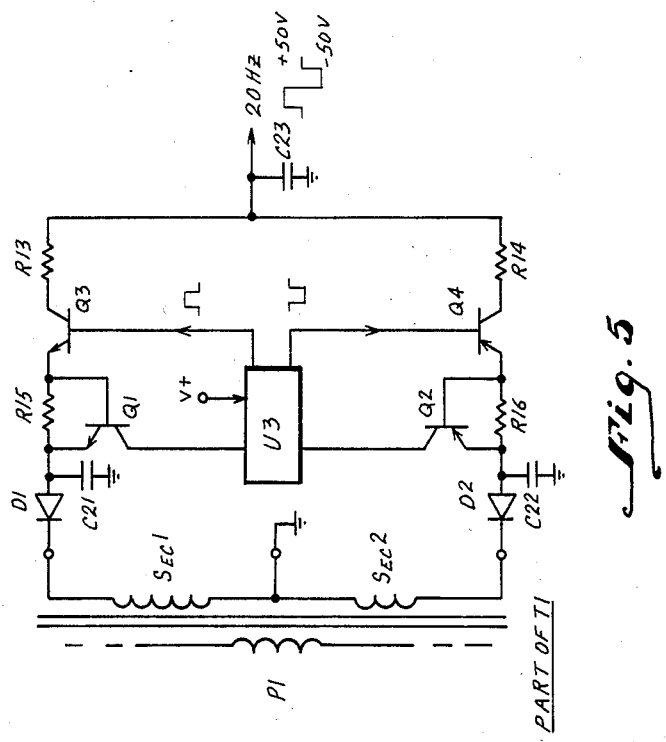
FIG. 5 is a schematic diagram of the ringer generator of FIG. 2.
Figure 4:
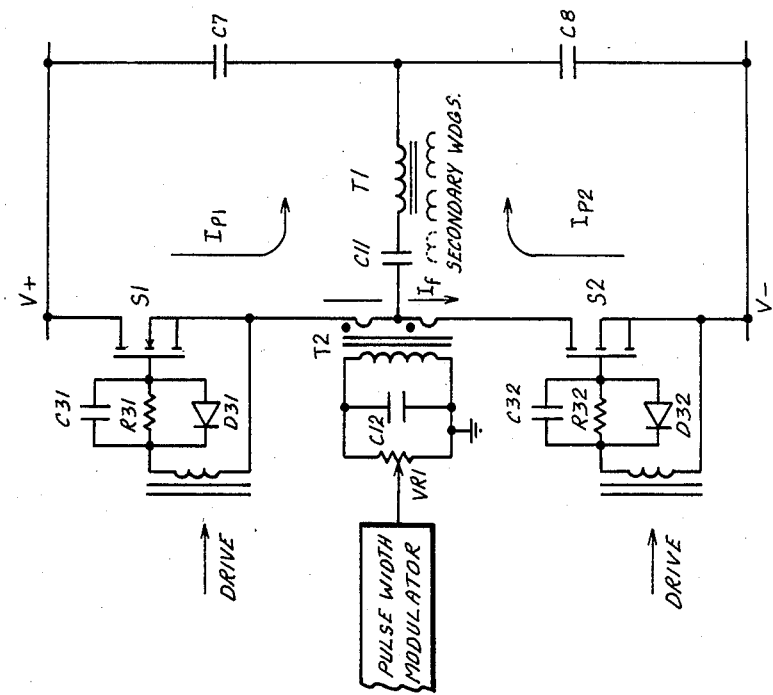
FIG. 4 is a schematic diagram of the current sense and drive circuitry portion of the circuit arrangement of FIG. 2.

FIG. 2 shows another embodiment of this invention in block diagram form. FIGS. 3, 4, and 5 show this embodiment in schematic diagram form. In the circuit described in FIG. 3, the highly stable voltage of the Vref. output of the PWM unit 52 is divided by R3 and R4 to provide the error amplifier with a voltage reference at its non-inverting input. A sample of the −50 volt output is taken and suitably filtered via the RC network R1, C1 and R2. The filtered sample is then a.c. coupled via C2 and added to the non-inverting input of the error amplifier A of the PWM unit. The +5 volt output is sampled, filtered, and adjusted by the RC network R5, VR6, R7, R10, and C3, and fed to the inverting input of the error amplifier. The overall response of the error amplifier to both of its inputs is controlled by the RC network R8, R9, and C4.

L1 and L2 provide energy storage for the +5 volt output circuit, and for the −50 volt output circuit, respectively. C5 and C6 provide filtering and energy storage for transient load changes for the +5 volt output circuit, and for the −50 volt output circuit, respectively.

This configuration ensures excellent stable operation of the power supply under large load variations, and excellent noise performance from the −50 volt output due to a.c. regulation of the same, enabling the −50 volt output to be used directly as a source of "battery feed" voltage for a telephone PBX system.

Referring now to FIG. 4, power switching transistors S1 and S2 are alternately switched on and off at 100 KHz rate, the current to the primary of transformer T1 being sourced from +V to −V, and so on, via the coupling capacitor C11. As described in relation to FIG. 1, S1 and S2 are connected in the half-bridge configuration and comprise two high voltage FETs. S1 and S2 require only a small drive current from the PWM unit and they do not require complex turn-off circuitry. C11 largely frees T1 from possible core saturation problems under unbalanced drive conditions. The 100 KHz switching rate makes a very small core usage possible, thus permitting a very high power throughout compared to comparable linear regulators powered off the line.

Primary current flows through the two halves of the primary winding of current sensing transformer T2, one cycle at a time, thus the secondary winding of T2 receives a current proportional to this. The latter is transformed to a voltage of shape and level, consistent with shutdown requirements of the modulator circuit, by C12 and VR1.

In addition, any current flowing directly through S1 and S2 simultaneously, which may be encountered under fault conditions, is also sensed and provided with the same measure of protection described previously. C7 and C8 provide energy storage for rectified input power. C7 and C8 also provide high frequency decoupling of the drain of S1, and the source of S2, respectively. R31 and R32 prevent oscillation of S1, and S2, respectively. C31 and C32 provide fast turn-on of S1, and S2, respectively, by providing high-frequency bypass of R31, and R32, respectively. Diodes D31 and D32 provide fast turn-off of S1, and S2, respectively, by rapidly discharging the gate capacitances of S1, and S2, respectively.

If a load on the +5 volt output is varied, the +5 volt d.c. level will tend to vary in direct proportion to this load change. This variation is sampled and conditioned by the RC network R5, VR6, R7, R10, and C3 before being applied to the error amplifier A. This voltage is then amplified and used to modulate the drive output duty cycle. The available output energy is thereby adjusted by this method thus providing a constant output voltage regardless of the energy requirements of the load on the +5 volt output.

If we assume that the −50 volt output was constant, it can be seen that when the +5 volt output received the regulation described, the −50 volt circuit also received a change in duty cycle. The output choke of the −50 volt circuit will average-out this duty cycle change and its mean voltage output level will vary accordingly within acceptable limits. However, due to the finite settling time of the choke circuit during these transitions, current peaks occur which are reflected to the primary circuit causing peak current flowing through S1 and S2 of a potentially destructive level.

As one form of protection against such high primary currents, the current sensing circuit of FIG. 4 is utilized. However, the −50 volt feedback circuit also assists in this protection in addition to providing a.c. regulation of its output. When the −50 volt output experiences a transient voltage fluctuation, a sample of this is filtered and a.c. coupled to the error amplifier non-inverting input. This coupling effectively causes the PWM unit to compensate for these transient surges thereby ensuring that the primary current through S1 and S2 does not peak excessively under these load change conditions.

In addition to providing protection against excessive peak primary currents, the −50 volt feedback also ensures that any noise, created by switching and especially power line ripple (120 Hz), is applied to the PWM unit and regulated accordingly. This action provides a sufficiently electrically quiet −50 volt output to enable its usage as a "TALK" voltage supply in a PBX without the need for excessive extra output filtering.

Referring now to FIG. 5, a 20 Hz ringing generator is derived from a secondary winding of the transformer T1 as shown in FIG. 5. Transformer windings Sec. 1 and Sec. 2 provide a high voltage derived from that generating the d.c. regulated supply voltages, described previously. These voltages are rectified by D1 and D2 with the resulting d.c. potentials charging capacitors C21 and C22. These voltages are then alternately switched by Q3 and Q4 to charge the output capacitor C23. This provides a waveform across C23 of nominal d.c. level −50 volts with alternate excursions to +50 volts and −150 volts at nominal 20 Hz rate.

R13 and R14 provide a measure of filtering and current limiting of the output voltage. R15 and Q1, and R16 and Q2 provide current sensing and shutdown of the driving oscillator, U3, in the event of output overload conditions.

Although only particular embodiments of the invention have been described and illustrated, it will be apparent to those skilled in the art that various modifications may be made therein. It is therefore the intention in the appended claims to cover all such modifications as may fall within the true spirit and scope of the invention.

I claim:

1. A direct current to direct current converter for use in a power supply system including a direct current voltage source, said converter comprising:
   drive control means connected to said voltage source, operated to generate periodic primary pulses;
   transformer means connected to said drive control means and coupled to a plurality of output circuits operated in response to said primary pulses to generate a plurality of periodically occurring output pulses; and
   voltage feedback control means connected between one of said plurality of output circuits and said drive control means, said voltage feedback control means operated in response to the voltage output of said one output circuit to generate a pulse width adjustment signal, said drive control means operated in response to said adjustment signal to adjust the width of said primary pulses; wherein said drive control means comprises:
   a pulse width modulator operated to generate alternately occurring first and second switching pulse trains;
   a drive circuit connected to said pulse width modulator operated to amplify said first and second switching pulse trains; and
   a pair of switching field effect transistors, connected in a half-bridge configuration, operated in response to said first and second amplified pulse trains to generate said primary pulses, wherein there is further included:
   first voltage feedback control means direct current coupled between a first one of said plurality of output circuits and said drive control means, said first means operated in response to the voltage output of said first output circuit to generate a first pulse width adjustment signal, and
   second voltage feedback control means alternating current coupled between a second one of said plurality of output circuits and said drive control means, said second means operated in response to the voltage output of said second output circuit to generate a second pulse width adjustment signal, said drive control means operated in response to said first and second adjustment signals to adjust the width of said primary pulses.

2. A converter as claimed in claim 1, wherein said direct current voltage source comprises:
   connection means for providing a connection between a source of alternating current power and said systems; and
   input rectification and filtering means coupled to said connection means for rectifying and filtering said alternating current power.

3. A converter as claimed in claim 1, wherein there is further included:
   capacitive coupling means, connected between said drive control means and said transformer means, for capacitively coupling said periodic primary pulses from said drive control means to said transformer means.

4. A converter as claimed in claim 1, wherein one of said plurality of output circuits comprises a source of a low frequency, high voltage signal for enabling ringing of telephones.

5. A converter as claimed in claim 1, wherein there is further included:
   current sensing means coupled to said transformer means operated in response to the level of the current flowing through the primary of said transformer means to generate an overcurrent indication to said drive control means.

6. A direct current to direct current converter for use in a power supply system including a direct current voltage source, said converter comprising:
   drive control means connected to said voltage source, operated to generate periodic primary pulses;
   transformer means connected to said drive control means and coupled to a plurality of output circuits operated in response to said primary pulses to generate a plurality of periodically occurring output pulses; wherein there is further included:
   current sensing means coupled to said transformer means operated in response to the level of the current flowing through the primary of said transformer means to generate an overcurrent indication to said drive control means, wherein said current sensing means comprises;
   a current sensing transformer means coupled to said output transformer means, comprising a core, a primary winding with two halves, each coupled to the primary winding of said output transformer, and a secondary winding;
   a capacitor, connected across said secondary winding; and
   a center-tapped resistor, with its ends connected across said secondary winding in parallel with said capacitor, and with its center-tap connected to said drive control means to provide a current sensing signal thereto, such that said current sensing means provides output transformer isolated current sensing.

7. A direct current converter for use in a power supply system including a direct current voltage source, said converter comprising:
   drive control means connected to said voltage source, operated to generate periodic primary pulses;
   transformer means connected to said drive control means and coupled to a plurality of output circuits operated in response to said primary pulses to generate a pluraltiy of periodically occurring output pulses;
   first voltage feedback control means direct current coupled between a first one of said plurality of output circuits and said drive control means, said first means operated in response to the voltage output of said first output circuit to generate a first pulse width adjustment signal; and
   second voltage feedback control means alternating current coupled between a second one of said plurality of output circuits and said drive control means, said second means operated in response to the voltage output of said second output circuit to generate a second pulse width adjustment signal, said drive control means operated in response to said first and second adjustment signals to adjust the width of said primary pulses.

8. A converter as claimed in claim 6, wherein said direct current voltage source comprises:
   connection means for providing a connection between a source of alternating current power and said system; and
   input rectification and filtering means coupled to said connection means for rectifying and filtering said alternating current power.

9. A converter as claimed in claim 6, wherein there is further included:
   capacitive coupling means, connected between said drive control means and said transformer means, for capacitively coupling said periodic primary pulses from said drive control means to said transformer means.

10. A converter as claimed in claim 6, wherein one of said plurality of output circuits comprises a source of a low frequency, high voltage signal for enabling ringing of telephones.

11. A converter as claimed in claim 6, wherein there is further included:
    current sensing means coupled to said transformer means operated in response to the level of the current flowing through the primary of said transformer means to generate an overcurrent indication to said drive control means.

12. A converter as claimed in claim 7, wherein said direct current voltage source comprises:
    connection means for providing a connection between a source of alternating current power and said systems; and
    input rectification and filtering means coupled to said connection means for rectifying and filtering said alternating current power.

13. A converter as claimed in claim 7, wherein there is further included:
    capacitive coupling means, connected between said drive control means and said transformer means, for capacitively coupling said periodic primary pulses from said drive control means to said transformer means.

14. A converter as claimed in claim 7, wherein one of said plurality of output circuits comprises a source of a low frequency, high voltage signal for enabling ringing of telephones.

15. A converter as claimed in claim 7, wherein there is further included:
    current sensing means coupled to said transformer means operated in response to the level of the current flowing through the primary of said transformer means to generate an overcurrent indication to said drive control means.

* * * * *